United States Patent [19]
Genrich

[11] Patent Number: 6,055,280
[45] Date of Patent: Apr. 25, 2000

[54] HIGH DATA RATE DIGITAL DEMODULATOR AND BIT SYNCHRONIZER

[75] Inventor: Thad Genrich, Aurora, Colo.

[73] Assignee: Raytheon Company, Lexington, Mass.

[21] Appl. No.: 08/884,299

[22] Filed: Jun. 27, 1997

[51] Int. Cl.[7] .............................................. H04L 27/16
[52] U.S. Cl. ............................................ 375/325; 329/308
[58] Field of Search .................................... 375/324, 325, 375/326, 345, 329, 332; 329/304, 307, 308

[56] References Cited

U.S. PATENT DOCUMENTS

| | | | |
|---|---|---|---|
| 4,873,683 | 10/1989 | Borth et al. ............................... | 370/337 |
| 4,893,316 | 1/1990 | Janc et al. ................................ | 708/300 |
| 4,947,408 | 8/1990 | Sadr et al. ................................ | 375/340 |
| 5,001,727 | 3/1991 | McDavid .................................. | 375/326 |
| 5,271,039 | 12/1993 | Suzuki ..................................... | 375/327 |
| 5,491,725 | 2/1996 | White ...................................... | 375/324 |
| 5,594,759 | 1/1997 | Iwamatsu ................................. | 375/344 |
| 5,596,609 | 1/1997 | Genrich et al. .......................... | 375/350 |
| 5,604,746 | 2/1997 | Oto .......................................... | 370/481 |
| 5,610,948 | 3/1997 | Ninomiya et al. ....................... | 375/324 |
| 5,621,767 | 4/1997 | Brandt et al. ............................ | 375/344 |
| 5,638,140 | 6/1997 | Krishnamurthy et al. .............. | 348/735 |
| 5,640,416 | 6/1997 | Chalmers ................................. | 375/206 |
| 5,691,974 | 11/1997 | Zehavi et al. ........................... | 370/203 |
| 5,732,333 | 3/1998 | Cox et al. ................................ | 455/126 |
| 5,781,588 | 7/1998 | Abe et al. ................................ | 375/334 |
| 5,809,096 | 9/1998 | Martinez et al. ........................ | 375/375 |

*Primary Examiner*—Stephen Chin
*Assistant Examiner*—Lenny Jiang
*Attorney, Agent, or Firm*—Fish & Richardson P.C.

[57] ABSTRACT

Demodulation and bit synchronization apparatus that uses a plurality of field programmable gate arrays to provide parallel processing to implement demodulation and bit synchronization. An analog-to-digital converter converts and demultiplexes applied intermediate frequency signals having a substantially wide bandwidth to output demultiplexed data signals at a lower clock rate. A digital signal processor processes the demultiplexed data signals to produce detected signals. A plurality of algorithms are implemented in the demodulator and bit synchronizer that include Costas loop demodulators, for example implemented using a carrier loop/lock detector, a direct digital synthesizer and a plurality of multipliers. Eight-tap T/2 baseband equalizers are implemented using in-phase and quadrature-phase accumulators and equalizers, and an in-phase/mid-phase bit synchronizer is implemented using the in-phase accumulator and a mid-phase accumulator and equalizer. The implementation is unique in that most of the signals are demultiplexed to allow parallel processing.

11 Claims, 2 Drawing Sheets

6,055,280

HIGH DATA RATE DIGITAL DEMODULATOR AND BIT SYNCHRONIZER

BACKGROUND

The present invention relates generally to demodulators, and more particularly, to a high data rate digital BPSK/QPSK demodulator and bit synchronizer.

The known prior art includes conventional analog demodulators that are discussed in various text books. For example, reference is made to the text by John Proakis entitled "Digital Communications", published by McGraw-Hill (1983), which describes conventional analog demodulators. It is believed that digital signal processor (DSP) and application specific integrated circuit (ASIC) based demodulators may be under development by companies such as TRW and Interstate Electronics Corporation, for example, but nothing is known about the specifics of these devices.

Accordingly, it is an objective of the present invention to provide for a high data rate digital BPSK/QPSK demodulator and bit synchronizer.

SUMMARY OF THE INVENTION

To accomplish the above and other objectives, the present invention is a high data rate digital BPSK/QPSK demodulator and bit synchronizer that improves upon an FPGA-based digital BPSK demodulator and bit synchronizer disclosed in Provisional U.S. patent application Ser. No. 60012886, filed Mar. 5, 1996. The present invention improves upon this demodulator by using parallel processing techniques.

In general, the demodulator and bit synchronizer comprises an analog-to-digital converter for analog-to-digital converting and demultiplexing applied intermediate frequency signals having a substantially wide bandwidth to produce demultiplexed data signals at a lower clock rate. A digital signal processor is coupled to the analog-to-digital converter for processing the demultiplexed data signals to produce detected signals that are output from the digital demodulator and bit synchronizer.

The present invention is intended to provide a low cost high flexibility demodulator and bit synchronizer function for data rates up to 125 MBPS for BPSK modulated data or 250 MBPS for QPSK modulated data. Low cost is achieved on a nonrecurring basis through the use of commercial field programmable gate array (FPGA) devices to perform digital signal processing functions, thus avoiding the high development costs of application specific integrated circuits. Recurring costs are reduced through the maximum use of DSP techniques to reduce or eliminate alignment associated with analog implementations. Commercial FPGA devices also provide reduced recurring costs due to higher production volumes and competition.

Maintenance and upgrade costs are also reduced through the use of FPGA devices, because the lifetime of an FPGA is extended through multiple IC process generations. A custom ASIC must be re-designed when the process it is based on is no longer supported. Upgrade costs are minimized through the flexibility of an FPGA implementation. A single hardware design supports a number of changes given adequate FPGA capacity and routing resources.

The flexibility of an FPGA based approach allows the design to be modified without making hardware changes. This allows modifications or increased functionality to be implemented with a low nonrecurring cost.

The present invention is intended for use in applications such as Space Based Infrared System (SBIRS), Landsat 7, Earth Observing System (EOS), and other high data rate ground station applications, for example.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
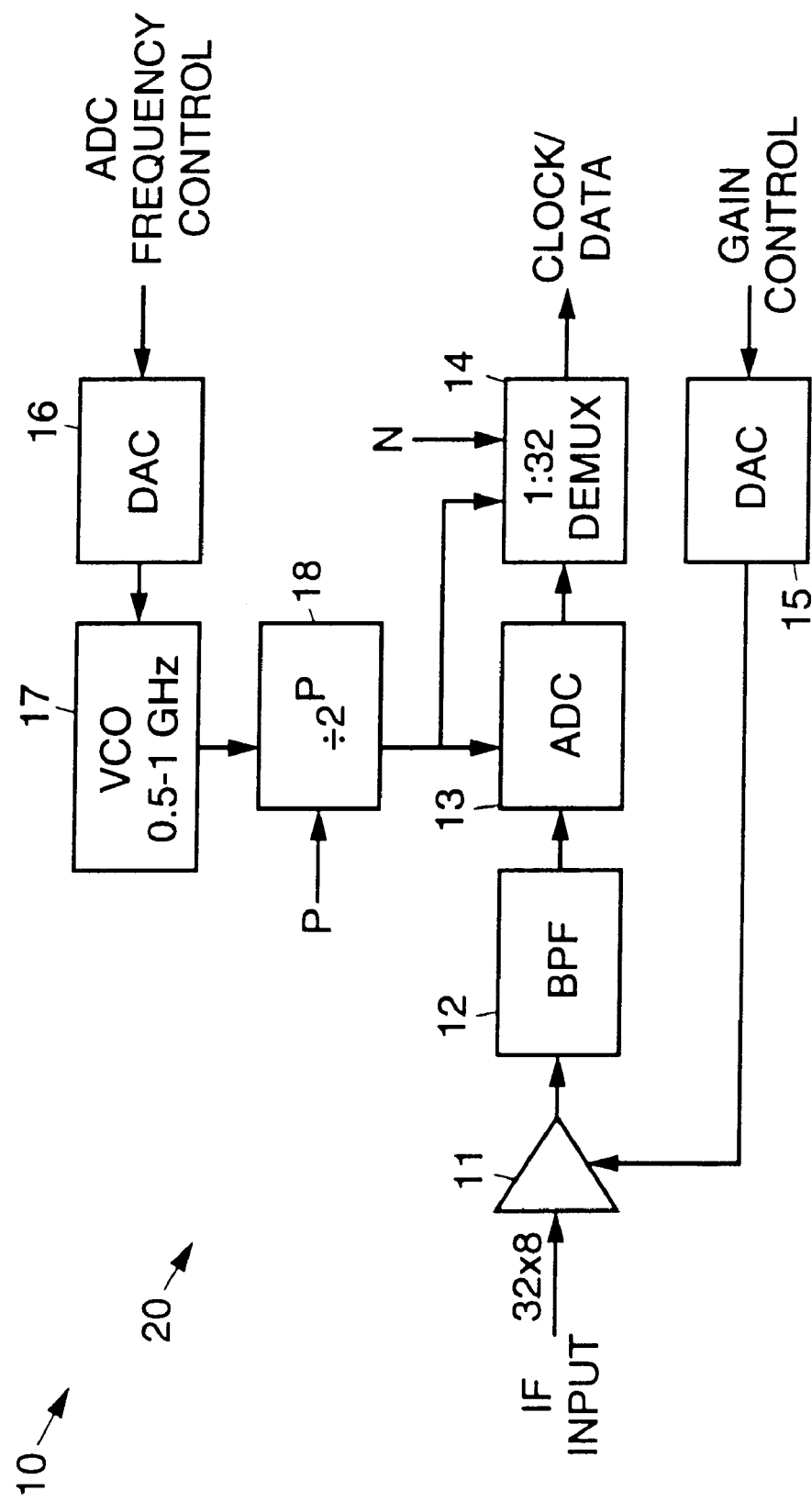
FIG. 1 illustrates a front-end analog-to-digital converter of a high data rate digital BPSK/QPSK demodulator and bit synchronizer in accordance with the principles of the present invention.

Referring to the drawing figures, FIG. 1 is a block diagram of a front end analog/analog-to-digital conversion (ADC) section 20 or analog-to-digital converter 20 of a high data rate digital BPSK/QPSK demodulator and bit synchronizer 10 in accordance with the principles of the present invention. The analog/ADC section 20 comprises an analog automatic gain control (AGC) amplifier 11 that is coupled by way of an intermediate frequency (IF) bandpass filter (BPF) 12 and an analog-to-digital converter 13 to a 1:32 demultiplexer 14 which outputs a data signal at a lower or divided clock rate. The analog AGC amplifier 11 is controlled by a first digital-to-analog converter (DAC) 15 that receives gain control input signals from an AGC loop 26 (FIG. 2) to provide digital gain adjustment.

The analog-to-digital converter 13 converts received wide bandwidth IF input signals into 8 bit digital samples. Clock signals supplied to the analog-to-digital converter 13 is controlled by a voltage controlled oscillator (VCO) 17, which is tuned to an integer multiple of the bit rate. The VCO 17 may also be a voltage controlled crystal oscillator VCXO 17 for fixed data rates to provide better phase noise characteristics. Frequency control signals derived from a bit sync loop and lock detector 25 (FIG. 2) are supplied to the voltage controlled oscillator 17 by way of a second digital to analog converter 16. The output of the voltage controlled oscillator 17 is coupled by way of a programmable VCO output prescaler 18 (divide by $2^P$) to provide the clock signals to the analog-todigital converter 13 and the demultiplexer 14. An input P is supplied by a programming register of control software or by switches, for example. The demultiplexer 14 also receives an input N which is also supplied by a programming register of the control software or switches.

In operation, the IF input signals pass through the analog AGC amplifier 11 which provides variable input gain and improves the noise figure for low level input signals. The gain of the analog AGC amplifier 11 is controlled by the first digital-to-analog converter 15 which provides for digital gain adjustment thereof. The IF bandpass filter 12 rejects input frequencies above a 400 MHz input bandwidth of the analog-to-digital converter 13. The analog-to-digital converter 13 converts the wideband IF input signals to 8 bit digital samples at rates up to 1 gigasamples per second (GSPS).

The voltage controlled oscillator 17 operates at 500 MHz to 1 GHz and controls the clock signals supplied to the analog-to-digital converter 13. The clock signals are tuned to an integer multiple of the bit rate. The voltage controlled oscillator 17 is controlled by way of the second digital to analog converter 16 from the bit sync loop and lock detector 25. The programmable VCO output prescaler 18 is used to lower power dissipation for lower bandwidth/data rate input signals. The output of the analog-to-digital converter 13 is demultiplexed by the demultiplexer 14 into 32 parallel 8 bit samples (256 bits per output word) at a maximum rate of 31.25 Mwords/sec.

The high data rate digital BPSK/QPSK demodulator and bit synchronizer 10 utilizes a 1 GSPS analog to digital converter 13 and field programmable gate arrays to process data rates up to 250 MBPS using commercially available parts The field programmable gate arrays that may be used to implement the present invention are listed in Table 1.

Figure 2:
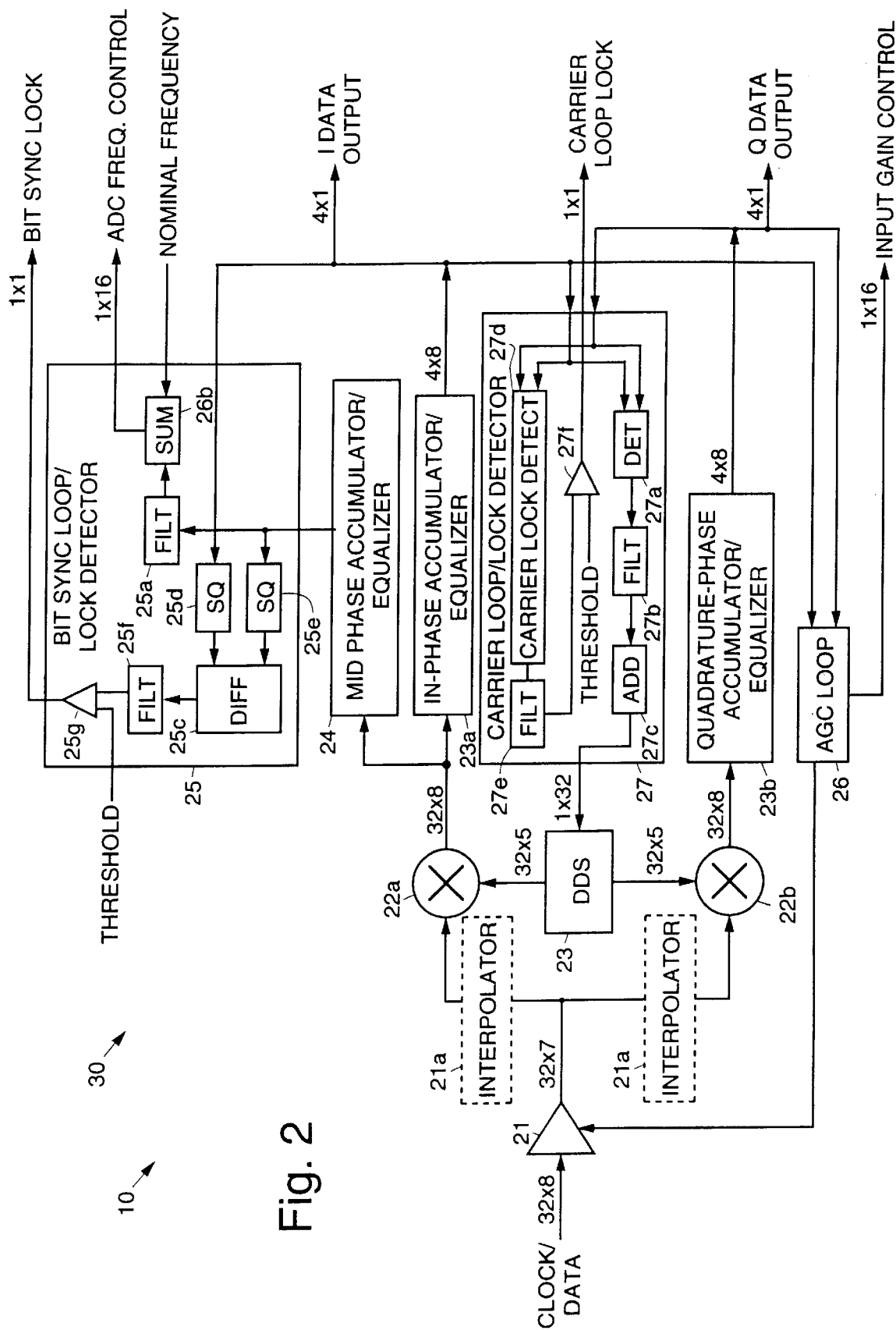
FIG. 2 illustrates a digital signal processor employed in the demodulator and bit synchronizer.

A block diagram of a digital signal processor 30 that performs digital signal processing (DSP) functions of the demodulator and bit synchronizer 10 is shown in FIG. 2, and is also referred to as a demodulator and bit synchronizer section 30 of the demodulator and bit synchronizer 10. The data signals derived from the front end analog/ADC section 20 shown in FIG. 1 are input to a plurality of parallel digital AGC amplifiers 21, whose outputs are split along I and Q data paths and applied to first inputs of I and Q multipliers 22a, 22b. It was stated above that the voltage controlled oscillator 17 is tuned to an integer multiple of the bit rate. However, it is to be understood that interpolators 21a may be used to allow noninteger sample rate to bit rate ratios. Such interpolators 21a would be disposed between the AGC amplifier 21 and inputs to the multipliers 22a, 22b.

A direct digital synthesizer (DDS) 23 in conjunction with a carrier loop/lock detector 27 supplies a demultiplexed local oscillator reference input signals to second inputs of the I and Q multipliers 22a, 22b. An output of the I multiplier 22a is input to an in-phase accumulator and equalizer 23a. The output of the in-phase accumulator and equalizer 23a provides an in-phase (I) data output of the demodulator and bit synchronizer 10. The output of the in-phase accumulator and equalizer 23a is coupled to the carrier loop/lock detector 27 and to the AGC loop 26.

An output of the Q multiplier 22b is input to a quadrature-phase accumulator and equalizer 23b. The output of the quadrature-phase accumulator and equalizer 23b provides a quadrature-phase (Q) data output of the demodulator and bit synchronizer 10. The output of the quadrature-phase accumulator and equalizer 23b is coupled to the carrier loop/lock detector 27 and to the AGC loop 26. The AGC loop 26 outputs the input gain control signals that are supplied to the digital-to-analog converter 15 of the analog/ADC section 20.

The output of the in-phase multiplier 22a is input to a mid-phase accumulator and equalizer 24 that produces an output that is supplied to the bit sync loop/lock detector 25. The in-phase data output signals from first the in-phase accumulator and equalizer 23a are also supplied to the bit sync loop/lock detector 25. The bit sync loop/lock detector 25 outputs bit sync lock signals and ADC frequency control signals that is supplied to the second digital to analog converter 16. Bit sync lock signals are supplied as status signals to the control software, or drive a status light or indicator on a display, for example, to indicate that lock has been achieved.

Algorithms that are implemented in the demodulator and bit synchronizer 10 include standard Costas loop BPSK or QPSK demodulators (implemented using the carrier loop/lock detector 27, the direct digital synthesizer 23 and the multipliers 22a, 22b), 8-tap T/2 baseband equalizers (implemented using the in-phase and quadrature- phase accumulators and equalizers 23a, 23b), and an in-phase/mnid-phase bit synchro- nizer (implemented using the in-phase accumulator 23b and mid-phase accumulator and equalizer 24). The implementation is unique in that most of the signals are demultiplexed to allow parallel processing.

FIG. 2 is annotated with the number of parallel signals at each stage followed by an "x" and then the number of bits per signal. The bit widths shown in FIG. 2 may be readily adjusted to provide improved performance based on simulation results, for example. All of the functions performed in the demodulator and bit synchronizer 10 may be implemented in Altera 10K100 FPGA devices, each containing 62,000 equivalent gates of programmable logic and 24,576 bits of internal RAM.

In operation, the IF input signals pass through the parallel digital AGC amplifiers 21 which is used in cases where the analog AGC amplifier 11 is disabled or is operating at it's maximum gain. Outputs of 32 parallel AGC amplifiers 21 are connected to the I and Q multipliers 22a, 22b. The local oscillator reference for the I and Q multipliers 22a, 22b is a demultiplexed output of the direct digital synthesizer 23 which provides 32 cosine and 32 sine outputs controlled by a single digital input tuning word output by the carrier loop/lock detector 27.

The 32 parallel outputs from the I multipliers 22a are fed to the in-phase accumulator and equalizer 23a which provides the I data output of the demodulator and bit synchronizer 10, to the carrier loop and lock detector 27 (Costas loop 27), to the bit sync loop and lock detector 25, and to the AGC loop 26. The I output signals are also processed by the mid-phase accumulator and equalizer 24 and are fed to the bit sync loop and lock detector 25. The 32 parallel Q output signals from the Q multiplier 22b are coupled to the quadrature-phase accumulator and equalizer 23b which provides the Q data output of the demodulator and bit synchronizer 10, to the Costas loop 27, and to the AGC loop 26. The in-phase, quadrature-phase and mid-phase equalizers 23a, 23b, 24 each implement eight 5 bit programmable coefficient by 7 bit data multipliers. The outputs of the accumulator and equalizers 23a, 23b 24 are each 4 samples wide, and are updated at one-fourth of the bit rate. The maximum effective sample rate is 31.25 MSPS×4 samples, or 125 MSPS.

The AGC loop 26 may be switched between noncoherent $I^2+Q^2$) and coherent ($I^2-Q^2$) modes. The AGC loop 26 comprises a Type 1 loop (integrator loop) that provides for gain control. However, a Type 2 loop may be implemented if required.

The Costas loop 27 comprises an (I×Q) phase detector 27a for BPSK operation, or an (I×Q×($I^2-Q^2$)) phase detector 27a for QPSK operation. The Costas loop 27 includes a loop filter 27b that is a Type 2 filter, but a Type 3 filter may readily be implemented. The output of the loop filter 27b of the Costas loop 27 feeds a programmable nominal carrier frequency adder 27c, which in turn drives the direct digital synthesizer 23. The carrier lock detect function 27d is ($I^2-Q^2$) in BPSK mode, and ($I^2 \times Q^2 \times 6$)–($I^4 \times Q^4$) in QPSK mode. A lock detect filter 27e is a simple IIR low pass filter, and the carrier lock detect function 27d has a programmable lock detect threshold 27f.

The bit sync loop and lock detector 25 is an in-phase/mid-phase design that uses the output of the mid phase accumulator 24 as a phase detect signal, following inversion controlled by detected data transitions. In the bit sync loop and lock detector 25, an output of a Type 2 loop filter 25a is summed in a summing device 25b with the programmable nominal bit rate of the I data output signal, and the result controls the input sample rate of the IF input signal by way of the digital-to-analog converter 15 and voltage controlled oscillator 17 (FIG. 1). The lock detect signal is the difference (DIFF) 25c between in-phase squared (SQ 25d) and mid-phase squared (SQ 25e) signals. The lock detector has a lock detect filter 25d that is a simple UIR low pass filter, and has a programmable lock detect threshold 25g.

Filters used in the AGC loop 26, the Costas loop 27 and the bit sync loop and lock detector 25 may be those described in U.S. Pat. No. 5,596,609 entitled "Parallel Cascaded Integrator-Comb Filter", assigned to the assignee of the present invention, for example. The contents of U.S. Pat. No. 5,596,609 are incorporated herein by reference in its entirety.

In QPSK mode at the highest data rate, 4 bits of I data and 4 bits of Q data are available during each 31.25 MHz sample clock period. The data output interface is determined by selecting one of three output module types that provide either differential serial emitter coupled logic (ECL) clock and data outputs, Fibre Channel outputs, or Asynchronous Transfer Mode (ATM) outputs.

The demodulator and bit synchronizer 10 may be implemented on a single 9 U VME module with provision to mount three PCI Mezzanine Card (PMC) format modules. The analog input and ADC functions (FIG. 1) may be implemented on a double-width PMC format module. The double width module may include heat sinks on the back of the module, that cause the VME module/PMC assembly to occupy two VME slots. The third PMC may be one of the selectable output modules. The DSP functions may be implemented using twelve 10K100 FPGA devices. Table 1 summarizes each function, gate utilization, and pin utilization of each FPGA device of the demodulator and bit synchronizer 10. Each function shown in Table 1 may be implemented in a single FPGA, and the number of FPGA devices indicates the number of repetitions of that function in the overall design.

The demultiplexed processing provided by the present invention is not limited to implementation of BPSK/QPSK demodulators only. If a module has greater logic capability, then other more bandwidth-efficient and complex demodulators may be supported, such as continuous phase modulation (CPM) or M-ary quadrature amplitude modulation (QAM), for example. The design may be partitioned to support any one of several demodulator types on command by downloading a set of FPGA designs. A module with 20–25 Altera 10K100 FPGA devices may be used for such a design.

TABLE 1

| | FPGA Utilization | | | | |
|---|---|---|---|---|---|
| Function | Gates/FPGA to implement function | FPGA's (repetitions of function) | Total Gates (logic/FPGA × repetitions) | Logic Utilization/ FPGA (%) | Pin Utilization/ FPGA (%) |
| AGC amplifiers | 29,636 | 2 | 59,272 | 47.8 | 64.3 |
| DDS port/ multipliers | 39,928 | 4 | 159,712 | 64.4 | 88.7 |
| I/Q adders/ equalizers | 50,654 | 3 | 151,962 | 81.7 | 76.6 |
| Carrier phase detector | 49,352 | 1 | 49,352 | 79.6 | 55.2 |
| Carrier lock detector | 37,696 | 1 | 37,696 | 60.8 | 23.6 |
| Bit sync & loops | 47,244 | 1 | 47,244 | 76.2 | 77.5 |
| Totals/ averages | 42,418 (average) | 12 (total) | 505,238 (total) | 68.4 (average) | 64.3 (average) |

Advantages provided by the demodulator and bit synchronizer 10 include flexibility to implement a number of demodulator types through FPGA configuration downloads. This includes various demodulator types, such as PSK, FSK AM, data decoders such as NRZ, Bi-phase, and processing of analog signals such as frequency modulated and phase modulated signals.

The present invention provides support for a numerous processing bandwidths and data rates, and provides support for higher data rates using a faster analog-to-digital converter 13 and more FPGA devices. The present invention avoids nonrecurring expenses for custom ASIC devices by using commercial FPGA devices. The present invention allows sharing of nonrecurring module and unit costs when multiple demodulator types are implemented with a common module/unit design. The present invention has low long term risk of device obsolescence, since commercial pressures cause FPGA devices to be supported through multiple fabrication processes, and new devices to be backward compatible with previous devices. The output capability of the present invention is based on PCI Mezzanine Cards, and takes advantage of existing commercial high performance interfaces competitively priced for a high volume market.

Thus, a high data rate digital demodulator and bit synchronizer has been disclosed. It is to be understood that the described embodiment is merely illustrative of some of the many specific embodiments that represent applications of the principles of the present invention. Clearly, numerous and other arrangements can be readily devised by those art without depa g from the scope of the invention.

What is claimed is:

1. A digital demodulator and bit synchronizer comprising:
an analog-to-digital converter for analog to digital converting applied intermediate frequency signals having a substantially wide bandwidth to produce digital samples corresponding to the applied intermediate frequency signals at a first rate;

a demultiplexer coupled to the analog-to-digital converter for demultiplexing the digital samples to produce a multiplicity of parallel demultiplexed data signals at a lower rate; and a digital signal processor, including a mixer, coupled to the demultiplexer for converting the multiplicity of parallel demultiplexed data signals in parallel to data signals at a frequency lower than the applied intermediate frequency, such converted data signals being output in parallel from the digital demodulator and bit synchronizer.

2. The demodulator and bit synchronizer of claim 1 including a means for filtering the intermediate frequency signals and wherein the analog-to-digital converter is coupled to an output of the filtering means.

3. A digital demodulator and bit synchronizer comprising:
an analog-to-digital converter for analog to digital converting applied intermediate frequency signals having a substantially wide bandwidth to produce digital samples corresponding to the applied intermediate frequency signals;
a demultiplexer coupled to the analog-to-digital converter for demultiplexing the digital samples to produce a multiplicity of parallel demultiplexed data signals at a lower clock rate; and
a digital signal processor coupled to the demultiplexer for Processing the multiplicity of parallel demultiplexed data signals to produce detected signals that are output from the digital demodulator and bit synchronizer wherein the digital signal processor comprises:
a direct digital synthesizer and a carrier loop/lock detector for generating a demultiplexed local oscillator reference input signal;
multiplier and equalizer means coupled to the direct digital synthesizer for generating the detected signals that are output from the digital demodulator and bit synchronizer; and
a bit sync loop/lock detector coupled to the multiplier and equalizer means for generating bit sync lock signals and AGC frequency control signals.

4. The demodulator and bit synchronizer of claim 3 further comprising:
a digital AGC amplifier coupled between the analog-to-digital converter and the multiplier and equalizer means; and
an AGC loop coupled to the digital AGC amplifier for providing digital gain control signal thereto.

5. A digital demodulator and bit synchronizer comprising:
(a) an analog-to-digital converter comprising:
an analog AGC amplifier for receiving intermediate frequency signals having a substantially wide bandwidth;
an intermediate frequency bandpass filter coupled to the amplifier;
an analog-to-digital converter coupled to the intermediate frequency bandpass filter;
a demultiplexer coupled to the analog-to-digital converter that outputs data signals;
a first digital-to-analog converter coupled to the analog amplifier that receives gain control input signals; and
a voltage controlled oscillator coupled to the analog-to-digital converter that receives frequency control signals for controlling the analog-to-digital converter; and
(b) a digital signal processor comprising:
a digital AGC amplifier, whose output is split along in-phase and quadrature data paths;
an AGC loop for providing digital gain control signal to the digital AGC amplifier;
in-phase and quadrature multipliers coupled to receive the output of the digital AGC amplifier on first inputs thereof;
a carrier loop/lock detector coupled to a direct digital synthesizer for generating a demultiplexed local oscillator reference input signal which are coupled to second inputs of the in-phase and quadrature multipliers;
an in-phase accumulator and equalizer coupled to an output of the in-phase multiplier for providing an in-phase data output of the demodulator and bit synchronizer, which output is coupled to the carrier loop/lock detector and to the AGC loop;
a quadrature-phase accumulator and equalizer coupled to an output of the quadrature multiplier for providing a quadrature-phase data output of the demodulator and bit synchronizer, which output is coupled to the carrier loop/lock detector and to the AGC loop;
a mid-phase accumulator and equalizer coupled to the in-phase multiplier for providing a phase detect signal; and
a bit synch loop/lock detector coupled to the mid-phase accumulator for receiving the phase detect signal therefrom and coupled to the in-phase accumulator and equalizer for receiving the in-phase data output therefrom, and for outputting a bit sync lock signal and an AGC frequency control signal.

6. The demodulator and bit synchronizer of claim 5 wherein the analog-to-digital converter further comprises an intermediate frequency bandpass filter coupled to the analog AGC amplifier for filtering the intermediate frequency signals.

7. The demodulator and bit synchronizer of claim 5 wherein the analog-to-digital converter further comprises a programmable VCO output prescaler coupled between the voltage controlled oscillator and the analog-to-digital converter.

8. A digital demodulator and bit synchronizer comprising:
an analog-to-digital converter coupled to a demultiplexer for analog to digital converting applied intermediate frequency signals having a substantially wide bandwidth to produce digital samples corresponding to the applied intermediate frequency signals;
a demultiplexer coupled to the analog-to-digital converter for demultiplexing the digital samples to produce a multiplicity of parallel demultiplexed data signals at a lower clock rate; and
a digital signal processor coupled to the demultiplexer for processing the demultiplexed data signals to produce detected signals that are output from the digital demodulator and bit synchronizer, which digital signal processor comprises:
a direct digital synthesizer and a carrier loop/lock detector for generating a demultiplexed local oscillator reference input signal;
multiplier and equalizer means coupled to the direct digital synthesizer for generating the detected signals that are output from the digital demodulator and bit synchronizer; and
a bit sync loop/lock detector coupled to the multiplier and equalizer means for generating bit sync lock signals and AGC frequency control signals.

9. The demodulator and bit synchronizer of claim 8 wherein the analog-to-digital converter further comprises means for filtering the intermediate frequency signals.

10. The demodulator and bit synchronizer of claim 8 further comprising:
a digital AGC amplifier coupled between the analog-to-digital converter and the multiplier and equalizer means; and
an AGC loop coupled to the digital AGC amplifier for providing digital gain control signal thereto.

11. A digital demodulator, comprising:
an analog-to-digital converter for converting an applied intermediate frequency signal carrying data signals into corresponding digital samples at a first rate;
a demultiplexer coupled to the analog-to-digital converter for demultiplexing the digital samples into a series of parallel digital signals, the parallel digital signals in the series corresponding to the digital samples, such series of parallel digital signals being produced at output of the demultiplexer at a second rate lower than the first rate; and
a digital signal processor, including a mixer and detector, fed by the series of parallel digital signals, for translating the intermediate frequency to a lower frequency and for detecting the data signals at the translated, lower frequency, such detected data signals being output in parallel from the digital demodulator and bit synchronizer.

* * * * *